Aug. 17, 1965
R. E. STOKELY
3,200,615
SEALING ELEMENT
Filed Aug. 14, 1963
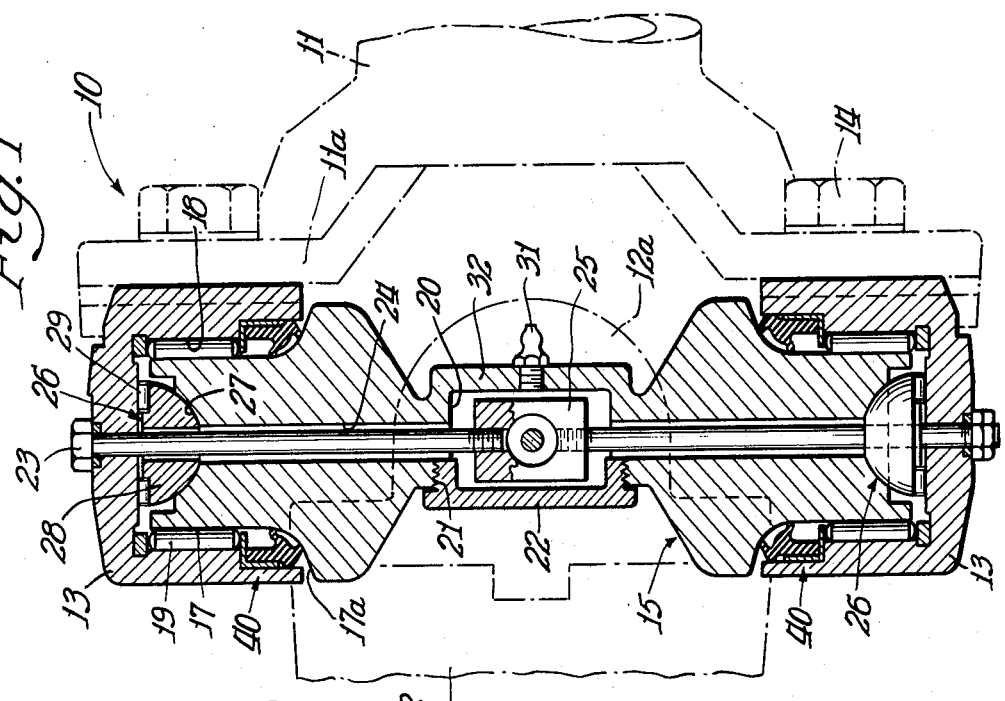
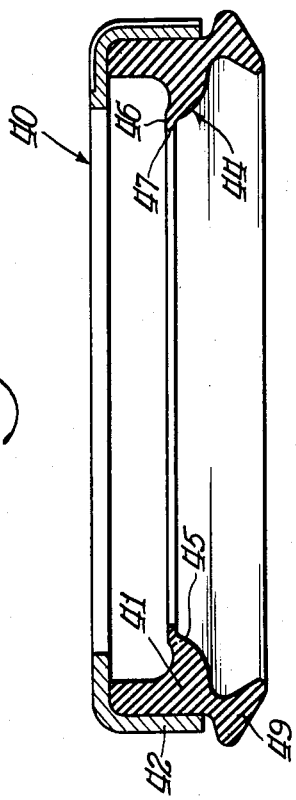
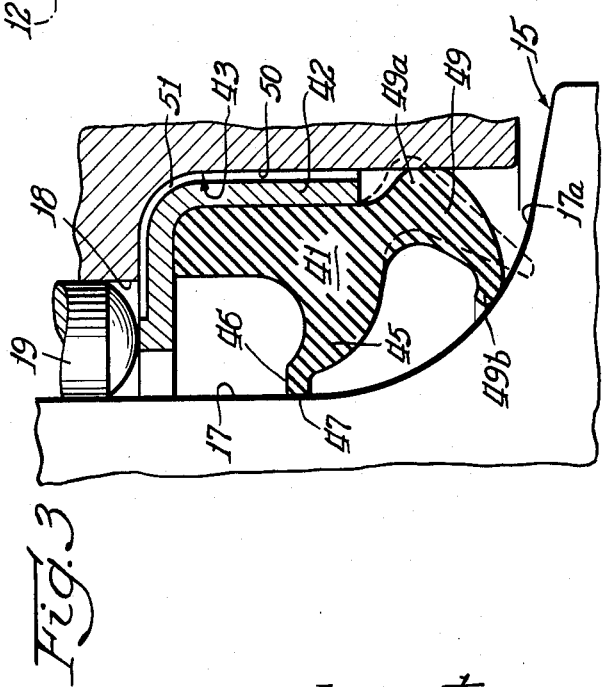
Inventor:
Raymond E. Stokely
By: Joseph W. Malleck Atty United States Patent Office 3,200,615
Patented Aug. 17, 1965

3,200,615
SEALING ELEMENT
Raymond E. Stokely, Rockford, Ill., assignor to Borg-Warner Corporation, Chicago, Ill., a corporation of Illinois
Filed Aug. 14, 1963, Ser. No. 302,165
7 Claims. (Cl. 64—17)

This invention relates to sealing elements and more particularly to sealing rings of elastomeric material having lips for sealing between the trunnion portions and bearing cups of universal joints.

In universal joints which employ yoke members adapted to be rotatively connected by a cross member having trunnion portions thereon, bearing means are used to pivotally connect said cross and yoke members. It is known to provide devices, which are frequently termed oil seals, in the bearings for keeping in lubricants and keeping out dust, foreign matter, liquids, air, gases, etc. With such seals it is usual to provide a metal ring-like casing to support a molded rubber or other fabricated flexible sealing element which has flanges and lips extending across and sealing between the bearing surfaces. However, satisfactory operation of the oil seals has been plagued by the requirements of higher speed operation. In such cases the surfaces against which the flexible lips must seal promote faster wear and thereby permit leakage.

It is a primary object of this invention to provide an improved sealing element for use particularly in universal joints of the high-speed type.

Another object of this invention is to provide a sealing element adapted to seal between concentrically disposed cylindrical surfaces and which is provided with a flanged lip which hydraulically locks in place during the lubricating operation of the bearing and releases said lock during high speed operation.

It is another object of this invention to provide a sealing element having an annular configuration adapted to seal between spaced cylindrical surfaces, said sealing element having a first sealing lip adapted to have a very light fit against one of said surfaces, said first lip being formed so that a lubricant lock is created between the seal and the surfaces during lubrication with a grease gun and releases said lock thereafter, said first lip having a substantial surface-to-surface contact with the sealed surface, and a second lip statically urged against the other of said surfaces.

Yet another object of this invention is to provide a sealing element for a universal joint having concentrically disposed cylindrical surfaces which not only has a primary sealing lip adapted to hydraulically lock during the lubricating operation of the bearings, but carries a secondary sealing lip which is adapted to permit bleeding of fluid therepast after predetermined high pressures have been obtained, said secondary lip being adapted to fit on a bias between portions of said surfaces disposed at an acute angle to provide said bleedable seal as well as position the seal element axially.

Still another object of this invention is to provide a sealing element for universal joint constructions of the above type which not only provides an adequate seal under high speed operations of the surfaces to be sealed, but also obviates the excessive wear problem under such conditions.

This invention consists of the novel constructions, arrangement and devices to be hereinafter described and claimed for carrying out the above stated objects and such other objects as will be apparent from the following description of a preferred form of this invention and illustrated with reference to the accompanying drawings:

FIG. 1 is a fragmentary central sectional view of a universal joint of the double-cardan type and having certain portions thereof shown in schematic form;

FIG. 2 is an enlarged central sectional view of the sealing element employed in the construction of FIG. 1; and FIG. 3 is a still further enlarged fragmentary view of a portion of the sealing element and adjacent parts of the universal joint; the dotted outline of the seal illustrates the unflexed condition.

Turning now in more particularity to the drawings, FIG. 1 illustrates a universal joint of the double-cardan type and embodying the principles of this invention. The joint, generally indicated 10, comprises rotatable input and output members 11 and 12 respectively, each having bifurcated portions 11a and 12a respectively, which form yokes. Each of the bifurcated portions carry bearing cups 13 having one side thereof secured to a portion of the bifurcations which are adapted to mate in proper contact. Suitable fasteners 14 extend between the bifurcations and the bearing cup to secure the latter together. The yokes of each of the input and output members are disposed at 90° to each other so that the bearing cups may receive opposed portions of a cross member 15. The arms of the cross are formed as trunnion portions provided with a highly machined cylindrical surface 17 having a radially inwardly disposed portion 17a flared outwardly. Likewise each of the bearing cups have an internal cylindrical surface 18 disposed in spaced relation to the trunnion surface 17. Needle bearings 19 are placed between said cylindrical surfaces 17 and 18 and are adapted to transmit force therebetween.

The cross is further formed with a central portion having a hollowed-out interior and provided with a circular threaded opening 21 closable by a cup 22. Tie-rods 23 are adapted to extend through central borings 24 concentrically formed through the trunnion portions for applying compressive stress between the bearing cups 13 and the cross 15. The tie-rods extend through each of the trunnion portions and are adapted to be coupled within the interior chamber 20 by coupler 25 which may be adjusted to vary the compressive stress; access to the coupler may be gained through the opening 21.

The tie-rods are adapted to apply the compressive stress of the bearing cup to the trunnion portions by way of male and female assembly 26 comprising a semi-spherical socket 27 formed in the outer end of each of the trunnion portions and concentrically disposed about the trunnion axis; a male element 28 of a mating semi-spherical configuration is disposed about the tie-rods and receives a compressive force from the bearing cup by way of a delrin-type roller thrust bearing 29 disposed between the bottom of the bearing cup and the outer end of the male element 28. The assembly 26 serves to maintain accurate alignment between the cylindrical surfaces 17 and 18 of the bearings by preventing outward deflection due to centrifugal forces of the bearing cups relative to the cross 15. Furthermore, perfect concentricity of the cylindrical surface 18 with respect to the surface 17 is obtained by the centering effect of the male and female elements.

Lubrication of the bearings is obtained by applying lubrication pressure from a grease gun to the nipple 31 mounted on the central portion 19; the lubricant thereby is forced out through the borings 24 to the bottom of the bearing cup and thereby around and to the needle bearings 19. In order to prevent the lubricant from being forced past the needle bearings and out past the flared portions of the trunnions, a sealing element 40 is disposed about each of the trunnion portions. The seal element comprises a primary circular body 41 of elastomeric material which is carried by a metal backing ring formed with an L-shaped cross section; the ring is bonded to the body by known methods. The metal backing ring is adapted to fit within an annular recess 43 formed within the surface 18 of the bearing cap. The primary body 41 of material has a first annular flange 44 extending radially inwardly thereof and has a tapered neck portion 45 terminating in an annular lip 46. The lip has a cylindrical surface 47 adapted to have a light engagement with the cylindrical surface 17 of the trunnion portion so that there will not be excessive wear therebetween even though the trunnion portion rotates at high speeds during operation relative to the seal element. The lip is offset in a direction parallel to the axis of the cylindrical surface 17 so as to form a pocket against which pressure may reside to provide an assist force for the lip during the lubricating operation. Thus, as lubrication is forced inwardly by a lubrication gun, the higher pressures tend to lock the lip more tightly against the surface 17 to retain lubricant therein. Such locking feature is released upon detachment of the lubrication gun.

The sealing element has a secondary flange 49 depending from the bottom portion thereof and extending toward the surface 50 formed as a part of the recess 43 in surface 18. The depending flange is formed in a modified V-shape in cross section and is adapted to extend on a bias between said surface 50 and the outwardly flared portion 17a of the trunnion surfaces 17 which are disposed at an acute angle relative to each other. The V-configuration is formed of a nose portion 49a and a chin portion 49b. The nose 49a is adapted to engage surface 50 of the recess by static forces inherent in the resilient body. The chin portion is adapted to engage the outwardly flared portion in a manner so that it may deflect in a direction towards the central body upon installation (see FIG. 3).

Lubrication is communicated to the secondary nose portion by groove 51 formed in the metal backing ring 42 and extending along the outer contours thereof. Lubrication may then bleed past said nose portion during a lubricating operation since no hydraulic lock is achieved thereat; the nose portion is statically urged against the surface 50 of the recess by its inherent resiliency. The end of the chin portion 49b also serves as an axial positioner for the seal element in cooperation with the metal supporting ring which abuts against the side of the recess.

While I have described my invention in connection with a certain specific construction and arrangement, it is to be understood that this is by way of illustration and not by way of limitation, that the scope of my invention is defined solely by the appended claims which should be construed as broadly as the prior art will permit.

I claim:

1. A sealing element adapted to seal between inner and outer concentrically disposed cylindrical surfaces comprising: an annular body of resilient material having a surrounding of rigid material nested against said outer cylindrical surface; said body having a first annular flange with sides extending toward the inner cylindrical surface and carrying an annular lip effective to engage said inner cylindrical surface, said body and first flange dividing the space between said cylindrical surfaces so that fluid may be entrained to one side of said flange, said lip of said first flange being offset from said first flange in a direction along said cylindrical surfaces so that fluid pressure to said one side of said element may assist in urging said lip against said inner cylindrical surface, a second annular flange depending from the bottom of said body and adapted to engage said outer cylindrical surface, said second annular flange being of a thickened nature relative to said first flange, and means on said body for maintaining the axial position of said seal between said surfaces.

2. A sealing element as in claim 1 in which said second flange is biased with respect to said outer cylindrical surface in a manner so that fluid to said one side thereof having sufficient pressure will urge said second flange away from said outer cylindrical surface to permit bleeding of said fluid.

3. A sealing element as in claim 1 in which said lip of said first flange is provided with a cylindrical surface complementary in configuration to said inner cylindrical surface to mate therewith.

4. In a universal joint having a cylindrical trunnion portion with the base thereof flared radially outwardly, and having a cylindrical bearing cup with a plurality of needle bearings disposed therebetween for transmission of force, a seal element disposed between said bearing cup and said trunnion portion for maintaining lubricant about said needle bearings, said sealing element comprising an annular body of resilient material having a first flange extending radially inwardly thereof and provided with a tapered neck portion terminating in an annular lip adapted to engage said trunnion portion, said annular lip being offset along said trunnion portion from said tapered neck so that pressure of said lubricant assists in urging said lip more tightly against said trunnion portion, a second annular flange depending from said body and having a rounded nose portion adapted to flexibly engage said bearing cup in a manner so that lubricant tends to bleed past said second annular flange when of a predetermined value, and a metal backing ring joined to said annular body and adapted to seal against said bearing cup, said ring having grooves therein permitting said lubricant to communicate with said second annular flange.

5. In a universal joint, a sealing element as in claim 4, in which said body has a third annular flange depending from the bottom thereof and adapted to engage said flared portion of said trunnion portion so as to position said sealing element against movement in one direction along said bearing cup.

6. In a universal joint, a sealing element as in claim 5 in which said lip of said first flange carries a straight cylindrical engaging surface adapted for maintaining surface-to-surface seal with the trunnion portion.

7. In a universal joint having concentrically disposed cylindrical surfaces with pressurized lubricant fluid disposed therebetween, a seal element for entraining said fluid therebetween comprising: a primary annular body of elastomeric material having a metal supporting ring nested against one of said cylindrical surfaces, said body having a primary annular flange extending radially inwardly thereof and terminating in an annular lip offset relative to said flange in a direction taken along said cylindrical surfaces and thereby providing a pocket for said lubricant to assist in urging said lip more tightly against said second cylindrical surface, said body having a secondary flange depending from the bottom thereof and having a nose portion adapted to engage said first cylindrical surface and a chin portion adapted to engage a portion of said second cylindrical surfaces disposed on a bias with respect to said first cylindrical surface, said second flange being flexed upon installation so as to be statically urged against said latter surface, means communicating said lubricant with said nose portion of said secondary flange.

References Cited by the Examiner
UNITED STATES PATENTS

| | | |
|---|---|---|
| 2,209,854 | 7/40 | Slaght. |
| 2,896,433 | 7/59 | Hempel. |
| 2,996,901 | 8/61 | Kleinschmidt. |
| 3,028,203 | 4/62 | Lund et al. _____ 308—187.1 |

FOREIGN PATENTS

| | | |
|---|---|---|
| 564,674 | 2/58 | Belgium. |

ROBERT C. RIORDON, *Primary Examiner.*